March 2, 1954  J. L. BAUMAN  2,670,669
REAR SECTION SUPPORT FOR TRACTOR MOUNTED IMPLEMENTS
Filed June 2, 1950

Inventor:
Jack L. Bauman
By: Paul O. Pippel
Atty.

Patented Mar. 2, 1954

2,670,669

UNITED STATES PATENT OFFICE 2,670,669

REAR SECTION SUPPORT FOR TRACTOR MOUNTED IMPLEMENTS

Jack L. Bauman, Canton, Ill., assignor to International Harvester Company, a corporation of New Jersey Application June 2, 1950, Serial No. 165,671

4 Claims. (Cl. 97—47.15)

This invention relates to argicultural implements and particularly to mechanism for supporting an implement when detached from the propelling vehicle. The invention is useful in connection with a number of implements, but is described herein in its application to the rear section of a tractor-mounted cultivator.

The rear cultivator section illustrated and described comprises one or more frame or drag bars which extend generally horizontally rearwardly from the tractor and support the earth working shovels which rest upon the surface of the ground when the section is detached from the tractor. If no support is provided therefor the forward portion of the frame bar will overbalance the implement and fall to the ground.

An object of the present invention is to provide means for rendering the implement self-supporting.

Another object of the invention is to provide a ground support for the implement so that it can be maintained in substantially the same position when detached from the tractor as when attached thereto, to thereby facilitate subsequent attachment to the tractor.

A further object of the invention is to provide improved means for adjustably securing a supporting standard to an implement frame bar, including means accommodating swinging the standard to an inoperative position where it can be carried by the implement when the latter is attached to the tractor.

Another object of the invention is to provide a novel, simple and economical clamping structure for adjustably securing a supporting standard to an implement, and for simultaneously securing the clamping structure to the implement frame.

Other objects and advantages of the invention will become clear from the folowing detailed description when read in conjunction with the accompanying drawings wherein.

Figure 1:
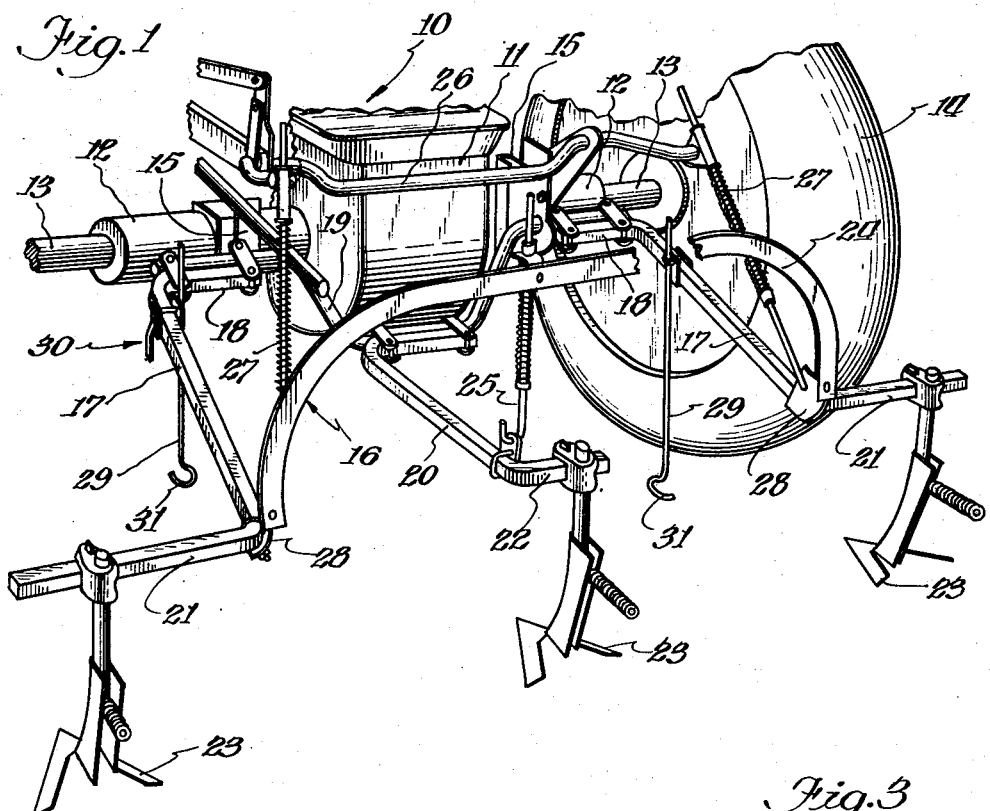
Fig. 1 is a perspective view of the rear end of a tractor having a rear cultivator section mounted thereon.

Referring to the drawings, there is shown in Fig. 1 the rear end of a tractor 10 having a transmission housing 11, and laterally extending rear axle housings 12 carrying axles 13. Drive wheels 14 are mounted on the axles, only one wheel being shown in the drawings.

Figures 2, 3:
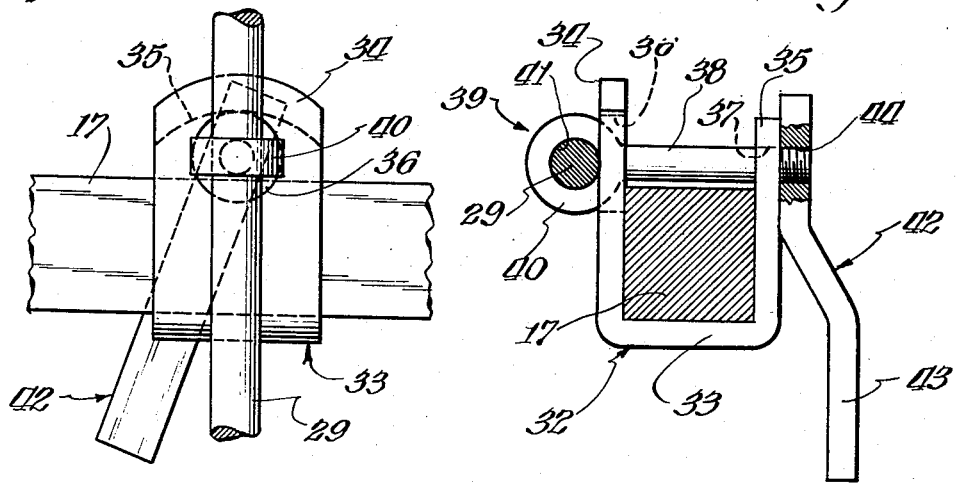
Fig. 2 is an enlarged detail in side elevation of the supporting standard and clamping assembly.
Fig. 3 is a view partly in section and with a part broken away for clarity showing the clamping assembly with the standard in inoperative position.

Brackets 15 are provided on the axle housings 12 and serve for the attachment to the tractor of a cultivator rear section 16 comprising laterally spaced drag or frame bars 17, square in cross-section, as indicated in Figure 3. Each frame bar extends rearwardly from the tractor and the transversely bent forward ends 18 are pivotally connected to an arched bar 19, to which is centrally connected another drag bar 20. Drag bars 17 and 20 have transversely bent rear ends 21 and 22, respectively, upon which are mounted conventional cultivator shovels 23. The rear ends of bars 17 are connected by a jockey arch 24, to which the bar 20 is connected by a rod 25. Lifting of the implement is accomplished by conventional mechanism including a rock shaft 26 and lift rods 27 connected to brackets 28 mounted at the ends of bars 17.

It is readily understood that when the implement is detached from the tractor the shovels 23 will support the rear end thereof but the weight of the forward end thereof will overbalance the implement. Therefore, in order to support the front end and maintain it at substantially the same height as when attached to the tractor, thus facilitating reconnection to the tractor, standards 29 are provided for attachment to the frame bars 17. The standards 29 and the clamping assemblies 30 by which they are adjustably secured to the frame bars are substantial duplicates and a description of one will suffice for both.

Each standard 29 is a cylindrical rod having at its lower end a supporting base adapted to rest upon the ground and in the form of a hook 31 which serves an additional purpose hereinafter set forth.

Clamping structure 30 comprises a U-shaped member 32 having a transverse bight portion 33 engaging the lower surface of bar 17 and upstanding straddling arms 34 and 35, the former of which is somewhat longer than the latter. These arms extend above the upper face of the frame bar and are provided with openings 36 and 37 to receive the shank 38 of an eye-bolt 39 threaded at its end and having an enlarged head 40 apertured to form an eye 41 for the sliding reception of standard 29.

Opening 37 in arm 35 is approximately the diameter of shank 38 to slidingly receive it so that the threaded end of the bolt projects therethrough, and opening 36 in arm 34 is considerably greater in diameter than the bolt shank of slightly less diameter than the head 40. Thus, as shown in Figure 3, a portion of the bolt head may penetrate the opening 36 until the plane of the outer face of arm 34 intersects the aperture or eye 41. Thus by drawing the bolt head into the opening 36 the rod 29 is brought into frictional engagement with the outer face of arm 34.

Bolt head 40 is drawn into the opening 36 to secure standard 29 in its desired position against axial displacement from the bolt eye and to also tighten the member 32 against the bar 17 by a tightening element comprising a manually operable lever 42 having a handle 43 at one end and a threaded opening 44 at its other end adapted to receive the threaded end of the bolt projecting beyond arm 35.

By manipulating lever 42, the U-shaped member 32 is secured to the frame bar in the desired location simultaneously with the fastening of standard 29 in its selected position when the implement is to be detached from its tractor support. When the implement is attached to the tractor the standard is moved to an inoperative position by manipulating lever 42 to loosen the clamping assembly and allow the rod 29 to be swung about the pivot of the bolt to a position alongside and substantially parallel to the bar 17. In this latter position the standard is conveniently carried by the implement with the hook 31 fitting upon the frame bar. This position of the hook on the bar 17 is readily understood and is not illustrated in the drawing.

It is believed that the novel clamp and standard assembly of this invention will be clearly understood from the foregoing description. It should also be understood that the invention has been described only in its preferred embodiment and that modifications may be made therein without departing from the spirit of the invention or the scope of the appended claims.

What is claimed is:

1. The combination with an adjustable standard for supporting an implement having a frame bar, of clamping mechanism for adjustably and detachably securing the standard to the frame bar comprising a U-shaped member having a bight portion engageable with the bar and arms straddling the bar, openings formed in said arms, an eye-bolt having a threaded shank receivable in and extending through said openings, the opening in one of said arms having a diameter to slidably receive the threaded shank of the bolt, a manually operable lever having a threaded opening in one end to receive the threaded end of the bolt extending through the arm of the U-shaped member, an enlarged head at the other end of the bolt having an eye therein adapted to slidably receive said supporting standard, the diameter of the opening in the adjacent arm of said member being only slightly less than the maximum outer diameter of said head, whereby a portion of the head is drawn into the opening by manipulation of said lever until the standard is brought into frictional engagement with the adjacent arm of said member.

2. The combination with an adjustable standard for supporting an implement having a frame bar, of clamping mechanism for adjustably and detachably securing the standard to the frame bar comprising a member surrounding a portion of the bar having arms engaging opposite sides thereof, openings formed in said arms to slidably receive a bolt having an enlarged apertured head and a shank having a threaded end extending through the opening in one of said arms, a rotatable tightening element having a threaded opening to receive the threaded end of the bolt, an aperture formed in said bolt head to slidably receive said supporting standard, the opening in the bolt-head-adjacent arm of said member being greater in diameter than the bolt shank but of slightly lesser diameter than said bolt head, whereby a portion of the bolt head penetrates said opening upon tightening the tightening element until said standard engages the adjacent arm of said member.

3. The combination with an adjustable standard for supporting an implement having a frame bar, of clamping mechanism for adjustably and detachably securing the standard to the frame bar comprising a member surrounding a portion of the bar having arms engaging opposite sides thereof, openings formed in said arms to slidably receive a bolt having an enlarged apertured head and a shank having a threaded end extending through the opening in one of said arms, an aperture formed in said bolt head to slidably receive said supporting standard, the opening in the bolt-head-adjacent arm of said member being greater in diameter than the bolt shank but of lesser diameter than the bolt head, and a manually operable lever having a handle and an aperture in the end opposite the handle threaded for reception of the projecting threaded end of the bolt shank, whereby the bolt head is drawn into the opening in the arm of the member until the standard engages the member.

4. The combination with an adjustable standard for supporting an implement having a frame bar, of clamping mechanism for releasably and adjustably securing the standard to the bar, comprising a generally U-shaped member having arms straddling the bar, openings formed in said arms, an eye bolt having a threaded shank and an enlarged head, an eye formed in said head to slidably receive the standard, said standard being swingable by rotating the bolt between a vertical operating position with the base of the standard engaging the ground and an inoperative position with the standard lying alongside the frame bar, the opening in the arm of said member adjacent the bolt head being sufficient in diameter to accommodate penetration of a portion of the bolt head therein until the standard frictionally engages the member, and a threaded tightening element adapted to receive the threaded end of the bolt shank for securing the standard in adjusted position.

JACK L. BAUMAN.

References Cited in the file of this patent

UNITED STATES PATENTS

| Number | Name | Date |
|---|---|---|
| 369,143 | White | Aug. 30, 1887 |
| 704,161 | Wilcox | July 8, 1902 |
| 1,469,448 | Seavey | Oct. 2, 1923 |
| 2,209,029 | Kriegbaum et al. | July 23, 1940 |

FOREIGN PATENTS

| Number | Country | Date |
|---|---|---|
| 18,557 of 1901 | Great Britain | Sept. 17, 1901 |